United States Patent
Hansen et al.

(10) Patent No.: US 6,497,911 B1
(45) Date of Patent: Dec. 24, 2002

(54) PROCESS FOR THE PREPARATION OF A WATER SOLUBLE COFFEE OR TEA PRODUCT FROM A NON-REWETTED PARTICULATE MATERIAL OBTAINED FROM AN EXTRACT BY DRYING

(75) Inventors: Ove Emil Hansen, Allerød (DK); Per Bo Sørensen, Copenhagen (DK); Jørgen Ilkjær, Frederiksberg (DK); Jens Mourits Sørensen, Virum (DK)

(73) Assignee: Niro A/S, Soborg (DK)

( * ) Notice: Subject to any disclaimer, the term of this patent is extended or adjusted under 35 U.S.C. 154(b) by 0 days.

(21) Appl. No.: 09/564,581

(22) Filed: May 5, 2000

Related U.S. Application Data

(63) Continuation of application No. PCT/DK00/00193, filed on Apr. 17, 2000.

(51) Int. Cl.[7] .............. A23F 5/00; A23F 5/12; A23F 3/00; A23F 3/32
(52) U.S. Cl. ............. 426/465; 426/472; 426/473; 426/453; 426/285; 426/594; 426/597; 426/388
(58) Field of Search .................. 426/465, 472, 426/473, 453, 285, 594, 597, 388

(56) References Cited

U.S. PATENT DOCUMENTS 3,767,419 A  10/1973  Sienkiewicz et al.
4,351,849 A  9/1982  Meade .................. 426/61
4,594,258 A  6/1986  Vitti et al.
4,640,839 A  2/1987  Hsu
5,951,895 A  9/1999  Green et al. ............ 219/388

FOREIGN PATENT DOCUMENTS

| EP | 0 331 222 | 9/1989 |
| EP | 0 373 697 A2 | 6/1990 |
| EP | 0 373 697 B1 | 2/1993 |
| EP | 0 852 909 A1 | 7/1998 |
| WO | WO 00/21654 | 4/2000 |

Primary Examiner—Anthony J. Weier
(74) Attorney, Agent, or Firm—Sughrue Mion, PLLC

(57) ABSTRACT

A moist non-rewetted particulate material obtained from an extract of e.g. coffee by drying, is subjected to a heat treatment being carried out without affecting the moisture content of the particulate material at a combination of temperature and time being adequate for effecting fusion so as to form a compact cake-like structure, which is disintegrated into granular material before drying to final moisture content, whereby fines may be separated without being subjected to final drying, and recirculated in the process. Hereby a product having an appearance similar to and a quality comparable to or better than that of freeze dried coffee can be obtained in a less expensive manner.

35 Claims, 3 Drawing Sheets

PROCESS FOR THE PREPARATION OF A WATER SOLUBLE COFFEE OR TEA PRODUCT FROM A NON-REWETTED PARTICULATE MATERIAL OBTAINED FROM AN EXTRACT BY DRYING

CROSS-REFERENCE TO RELATED APPLICATIONS

The present application is a continuation of International Patent Application No. PCT/DK00/00193 filed on Apr. 17, 2000.

FIELD OF THE INVENTION

The present invention relates to a process for the preparation of a water soluble coffee or tea product from a non-rewetted particulate material obtained from an extract by drying.

BACKGROUND OF THE INVENTION

Different processes are known for drying of extracts of coffee or tea so as to obtain a particulate material. Spray drying and freeze drying are examples of such processes. Also combined spray drying and belt drying processes, e.g. processes of the type known under the trademark FILTER-MAT® (Niro) may be selected out for mentioning.

Furthermore different processes for agglomeration of the obtained particulate material have been devised, such as different rewet-agglomeration processes, e.g. the process described in applicant's international patent application No. PCT/DK00/00009.

Thus it is known to spray dry a coffee extract in a spray drying plant so as to achieve a product, which is subsequently agglomerated e.g. by a rewet-agglomeration process as mentioned above.

Spray drying of a coffee extract in a combined spray and belt dryer of the FILTERMAT® type has been disclosed in U.S. Pat. No. 4,351,849. By this process a comparatively wet product is collected as a mat on a gas-permeable conveyor belt on which it is dried to final moisture content and cooled in sections immediately following the spray drying section before it is comminuted to agglomerates of desired size.

The appearance of the products obtained by the above two kinds of processes differ from each other and from that of a freeze dried product. The quality of the products obtained by each of the processes depends on the process details.

DISCLOSURE OF THE INVENTION

It is an object of the present invention to provide a process for the preparation of a coffee product having an appearance similar to that of freeze dried coffee and a quality, particularly a taste, being comparable to or better than that of freeze dried coffee, which process may be carried out in a process line being less expensive than a freeze drying line.

It is a further object to provide a process which can be carried out using a non-rewetted particulate material as starting material.

The above objects are achieved by the process according to the invention. However it should be noticed that the process according to the invention is not limited to the preparation of coffee products; it is also applicable to the preparation of tea products, including herbal teas and the like and mixtures of different teas. Furthermore, the expression coffee products should be understood so as to include both coffee and mixtures of coffee with coffee substitutes and the like.

For the sake of simplicity, the invention will be explained with particular reference to coffee.

Extensive experiments carried out by the inventors have shown that a certain combination of features is essential for achieving the above objects.

As starting material for the process according to the invention a non-rewetted particulate material obtained from an extract by drying is used. This particulate material should have a moisture content which is higher than the moisture content desired in the final product. Thus the starting material has not as yet been dried to final moisture content. Contrary to rewet-agglomeration processes where only a moistening of the surface layer of the particles is aimed at, the moisture content should be substantially uniform. The particles having a substantially uniform moisture content which is higher than the moisture content desired in the final product should be subjected to a heat treatment which is carried out essentially without affecting the moisture content of the particulate material. When they are subjected to the heat treatment, the particles should be present as a layer, and the heat treatment should be carried out at a combination of temperature and time being adequate for effecting fusion so as to convert the layer of particles into a compact cake-like structure. Finally the resulting cake-like structure should be disintegrated into granular material before the final drying is carried out. By this feature two advantages are obtained, one being that the final drying can be carried out more efficiently on a granular material than on a cake, and the other being that off-size particles may be separated and recirculated in the process without becoming subjected to more than one "final drying" and any consequential damage to the product quality. As furthermore a non-rewetted particulate material is used as starting material, it will be appreciated that a very lenient process is at issue.

From EP 0 373 697 B1 a process is known, wherein a granular beverage material is formed from a powdered extract of the beverage by sintering a powdered extract, which is already essentially dry, in an environment not being open to air, so as to form an agglomerate in which the particles of the starting material have been brought in a point-to-point contact so that they are bridged to one another without loosing their identity as a particle followed by granulation of the agglomerate. It is mentioned as essential that water vapour inherent in the powdered extract is retained during the sintering step. In line with the fact that the starting material is essentially dry, no subsequent drying of the obtained granulate is carried out. Thus, the condition of the material subjected to the sintering according to EP 0 373 697 B1 differs substantially from that of the material subjected to the heat treatment according to the invention, and the product obtained by the process according to EP 0 373 697 B1 has a much more loose structure than the product obtained by the process according to the invention, which has been confirmed by the present applicant by reproducing Example 1 of EP 0 373 697 B1.

Accordingly, the present invention provides a process for the preparation of a water soluble coffee or tea product from a non-rewetted particulate material obtained from an extract by drying, which comprises subjecting a layer of particulate material having a substantially uniform moisture content which is higher than the moisture content desired in the final product to a heat treatment, the heat treatment being carried out essentially without affecting the moisture content of the particulate material at a combination of temperature and time being adequate for effecting fusion so as to form a compact cake-like structure, disintegrating the cake-like structure into granular material after cooling as necessary, and subjecting the granular material to final drying, optionally after separation of off-size particles.

The particulate material having a substantially uniform moisture content which is higher than the moisture content desired in the final product may be obtained in a simple manner, viz. by interrupting the drying process before the moisture content desired in the final product has been reached. This procedure gives the additional advantage that the energy other-wise needed for final drying at this stage, is saved. Furthermore any loss of flavour during a final drying at this stage is avoided.

In a presently preferred embodiment, the particulate material is obtained from a combined spray drying and belt drying process, particularly a process of the type known under the trademark FILTERMAT®. It may also be obtained from other drying processes such as a spray drying process, e.g. using a spray dryer/fluid bed combination. However processes of the FILTERMAT® type are particularly suited for providing a starting material of adequate moisture content giving a very lenient drying due to the possibility of operating this process with a drying gas outlet temperature as low as 50–60° C.

The moisture content of the particulate material subjected to the heat treatment will typically be in the range from 4–12%, particularly in the range from 5–11% and preferably in the range from 6–10% by weight. Furthermore, the moisture content of the particulate material subjected to the heat treatment will typically be 1–10% and particularly 3–8% by weight (abs.) higher than the moisture content of the final product.

As mentioned above, the heat treatment should be carried out essentially without affecting the moisture content of the particulate material.

This requirement can be fulfilled by carrying out the heat treatment in an environment substantially in moisture equilibrium with the particulate material, such as an essentially closed or conditioned chamber.

In a presently preferred embodiment, the layer of particulate material is confined between opposed barriers when the heat treatment is carried out.

The barriers are preferably essentially non-pervious to gasses, whereby they will be able to create an essentially closed chamber by covering the major surfaces of the layer of particulate material.

In a further presently preferred embodiment, the opposed barriers are defined by or comprise an endless belt, which may be used in moving the layer to be subjected to the heat treatment. The belt is preferably made from a heat resistant polymer material, which may optionally be coated so as to improve the release property, e.g. as described in U.S. Pat. No. 5,951,895 (Formcook AB), the content of which is incorporated herein by reference.

In addition to or as an alternative to being supported on an endless belt during the heat treatment, the particulate material may be supported on an array of trays whereby the compact cake-like structure would be divided in smaller units. A similar effect could be achieved by providing the endless belt with some sort of partitioning walls, e.g. lamellae extending transversal to the direction of movement or in some other direction(s). Such subdivision of the cake-like structure may facilitate the subsequent disintegration into granular material.

However, as a certain compression of the layer during the heat treatment has been found to further the heat transfer and the formation of a cake of adequate structure, the use of endless belts without partitioning walls is generally preferred. Also, the two belts may be slightly converging in the direction of movement.

When the layer is compressed during the heat treatment, it will generally be compressed to 65–90% and particularly 70–85% of the initial thickness.

As an alternative to using barriers which are essentially non-pervious to gasses, one or both barriers may be pervious to gasses such as water vapour, in which case the barrier(s) in question should be surrounded by an environment substantially in moisture equilibrium with the particulate material to prevent evaporation and migration of moisture in the layer.

Furthermore, a barrier may consist of a combination of pervious and non-pervious elements, such as a gas-pervious belt with a non-pervious backing such as a heating plate, or a belt being essentially non-pervious to gasses, which is supported by a structure allowing compression of the layer during the heat treatment, said structure being non-pervious too or of a more open nature.

When an endless belt or an array of trays is used for moving the particulate material, the movement could be continuous or stepwise. The stepwise movement would typically be an incremental movement, but could, particularly when a small plant is at issue, be a movement from one stage to another in a discontinuous process.

The heat can be transferred to the layer of particulate material in different ways.

In a presently preferred embodiment, heat is transferred to the layer by means of conduction, e.g. using heating elements in contact with at least one of the barriers, belts, trays or other supporting structures. As will be appreciated by the person skilled in the art, the heat may be supplied to the heating elements in different ways, e.g. by means of a fluid medium such as hot oil, hot water or steam, or by means of electricity.

The heating elements will typically be operated with a surface temperature in the range from 60–120° C. and particularly in the range from 60–90° C.

As alternative or supplement, heat may be transferred to the layer of particulate material by means of convection or radiation, such as infrared radiation or microwaves. E.g. heat may be supplied to one side of the layer by means of conduction and to the other by means of radiation or convection or a combination thereof.

Heating means should preferably be arranged on both sides of the layer, as both a higher thickness of the layer and a more uniform heat treatment will thereby be allowed.

The heat treatment should be carried out at a combination of temperature and time being adequate for effecting fusion so as to form a compact cake-like structure.

Typically the heat treatment will be carried out for 2–30 min., and heat will typically be supplied to provide a temperature in the layer of particulate material in the range from 45–120° C. and particularly in the range from 50–90° C. The higher moisture content, the lower fusion temperature can be selected for a given material. In general, a comparatively high moisture content is selected in order to make the heat treatment as lenient as possible.

The thickness of the layer of particulate material during the heat treatment will typically be in the range from 10–50 mm, although thicknesses outside this range can be used. However the thickness should not be too small as there will always be some variation, and the relative effect of such variation will be comparatively larger on a thin layer than on a thick layer. Furthermore the thickness should not be so high as to result in an unacceptable variation of the heat treatment throughout the layer.

E.g. a 25 mm layer of a coffee material having a moisture content of 8–9% by weight may be subjected to heat treatment for about 9 min. at a heating element temperature of 80–85° C.

The layer of particulate material being subjected to the heat treatment should be as uniform as possible. For that purpose the particulate material may be disposed on the support, e.g. an endless belt, using a dosing unit, e.g. a vibrating chute. In general a bin will be interposed between the dryer and the device in which the process according to the invention is carried out in order to allow individual operation of the two units.

After the heat treatment, the cake-like structure may be cooled as necessary before it is disintegrated into granular material. Forced or non-forced cooling may be used as appropriate.

A suitable apparatus for carrying out the heat treatment and possible cooling according to the invention could be obtained by modification of the CONTACT-COOKER provided with two endless cooking belts intended for cooking meat products such as burgers etc., which is obtainable from the company Formcook AB.

The disintegration may be carried out in one or more steps, but will typically comprise a coarse disintegration of the cake followed by comminution, e.g. using a device of the hammer mill type.

The obtained granular material, still having a moisture content which is higher than the moisture content desired in the final product, is preferably subjected to a classification such as a sieving whereby off-size particles are separated before the granular material is subjected to final drying. Hereby the fines fraction which has not as yet been subjected to final drying and any consequential detrimental effect on the flavour etc., may be recirculated to the heat treatment step, or to the spray drying step where the addition of a certain amount of fines may be advantageous, or a combination thereof.

The final drying may be carried out in a conventional manner, e.g. using a belt dryer, a fluid bed dryer or a tray dryer.

The process according to the invention should be carried out in an environment allowing handling of the product. In tropical climate a room with conditioned air may be an appropriate environment.

A coffee product obtained by the process according to the invention has an appearance similar to that of a freeze dried coffee and an appropriate bulk density and solubility. Furthermore, it has been confirmed by gas chromatographic analysis that no appreciable change of the content of typical coffee flavour components (acetone, diethylketone, pentadione and pyridine) is taking place during the heat treatment.

DESCRIPTION OF SPECIFIC EMBODIMENTS

In the following the invention will be described in more detail with reference to the drawings.

Figure 1:
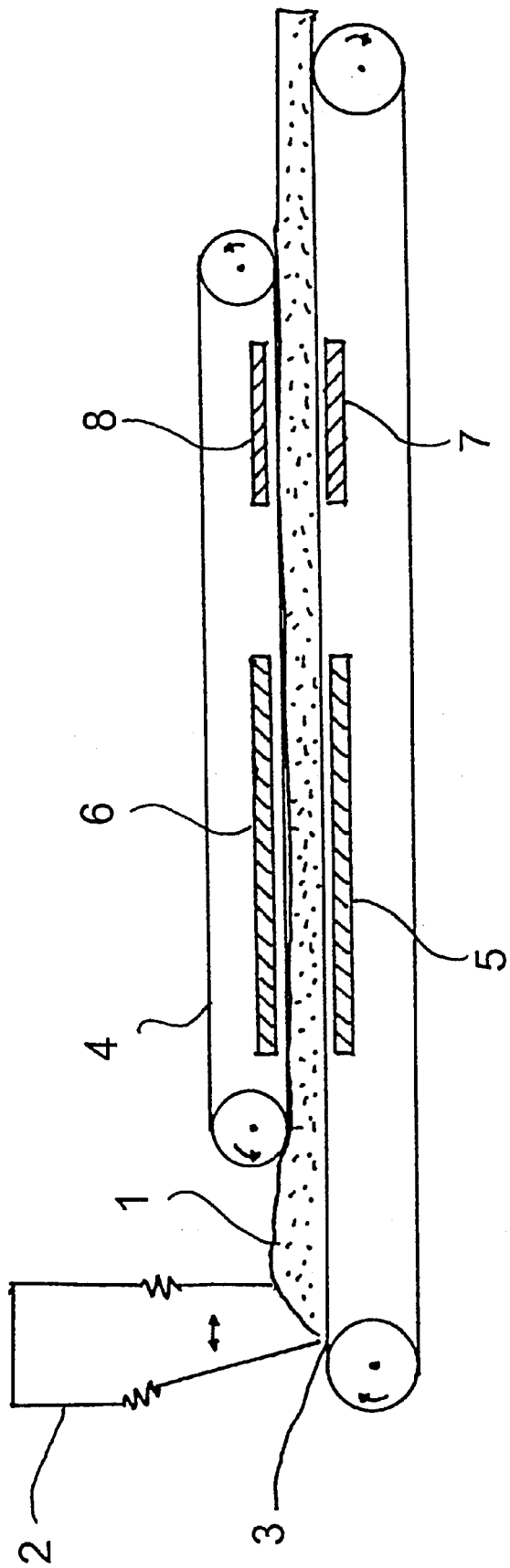
FIG. 1 is a very schematic sectional view illustrating an embodiment of the process according to the invention wherein the particulate material is confined between opposed endless belts during the heat treatment.

Referring to FIG. 1 an endless belt 3 is shown upon which a layer of moist particulate material 1 obtained from an extract by partial drying is deposited from a vibrating chute 2. The layer of particulate material 1 is compressed to about 75% of the initial thickness between endless belt 3 and a second endless belt 4 arranged above endless belt 3. Belts 3 and 4 are made from a heat resistant polymer material and are essentially non-pervious to gasses whereby an essentially closed chamber is created around the layer.

Below the upper part of endless belt 3 and above the lower part of endless belt 4, heating elements 5 and 6, respectively, and cooling elements 7 and 8, respectively are disposed in contact with the respective belt so as to transfer heat/effect cooling by conduction. Heating elements 5 and 6 and cooling elements 7 and 8 are metal blocks provided with channels for circulation of hot and cold water, respectively.

In the area between heating elements 5 and 6, the layer of particulate material 1 is fused to a cake-like structure which is subsequently cooled between cooling elements 7 and 8, when the layer is moved from left to right by means of the endless belts 3 and 4.

At the end of endless belt 3, the cake is subjected to a coarse disintegration into pieces which are subjected to further comminution in a grinder (not shown) to provide a granular material which is subjected to drying to final moisture content in a dryer (not shown) after optional separation of the fines fraction, which may be recirculated to the chute 2 or an earlier process stage.

Figure 2:
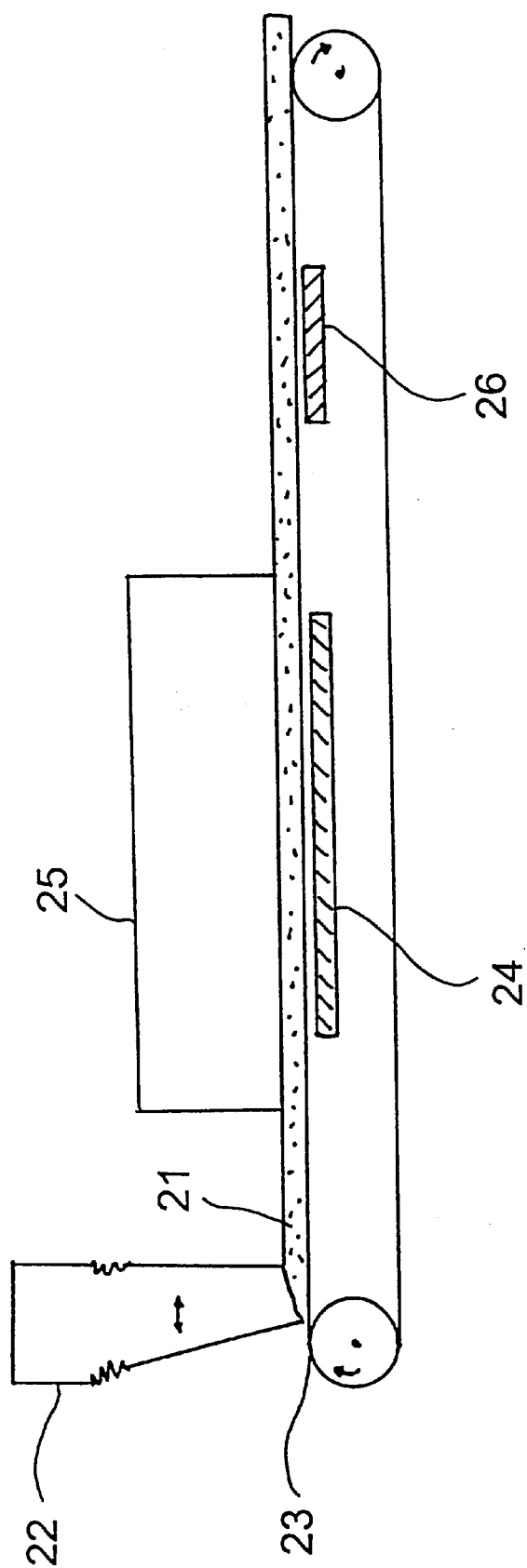
FIG. 2 is a very schematic sectional view illustrating an embodiment of the process according to the invention wherein the heat treatment is carried out in an environment substantially in moisture equilibrium with the particulate material.

FIG. 2 illustrates an embodiment differing from that illustrated in FIG. 1 in some respects. Like in FIG. 1, a layer of particulate material 21 is deposited on an endless belt 23 from a vibrating chute 22. Furthermore heating and cooling elements 24 and 26, respectively, are disposed below the upper part of endless belt 23 in contact therewith so as to transfer heat/effect cooling by conduction. However, no upper endless belt is provided. Instead a substantially closed chamber 25 is provided in the zone above heating element 5 so as to create an environment substantially in moisture equilibrium with the particulate material. Additional heating elements, such as sources for infrared radiation (not shown) may be provided in the chamber 25, e.g. at the ceiling thereof. The cooling provided by cooling element 26 may, if desired, be assisted or substituted by a cooling fan arranged in a suitable distance above the cake-like structure. The further processing of the cake may e.g. be carried out as described in connection with FIG. 1.

EXAMPLE

Preparation of a coffee product.

Figure 3:
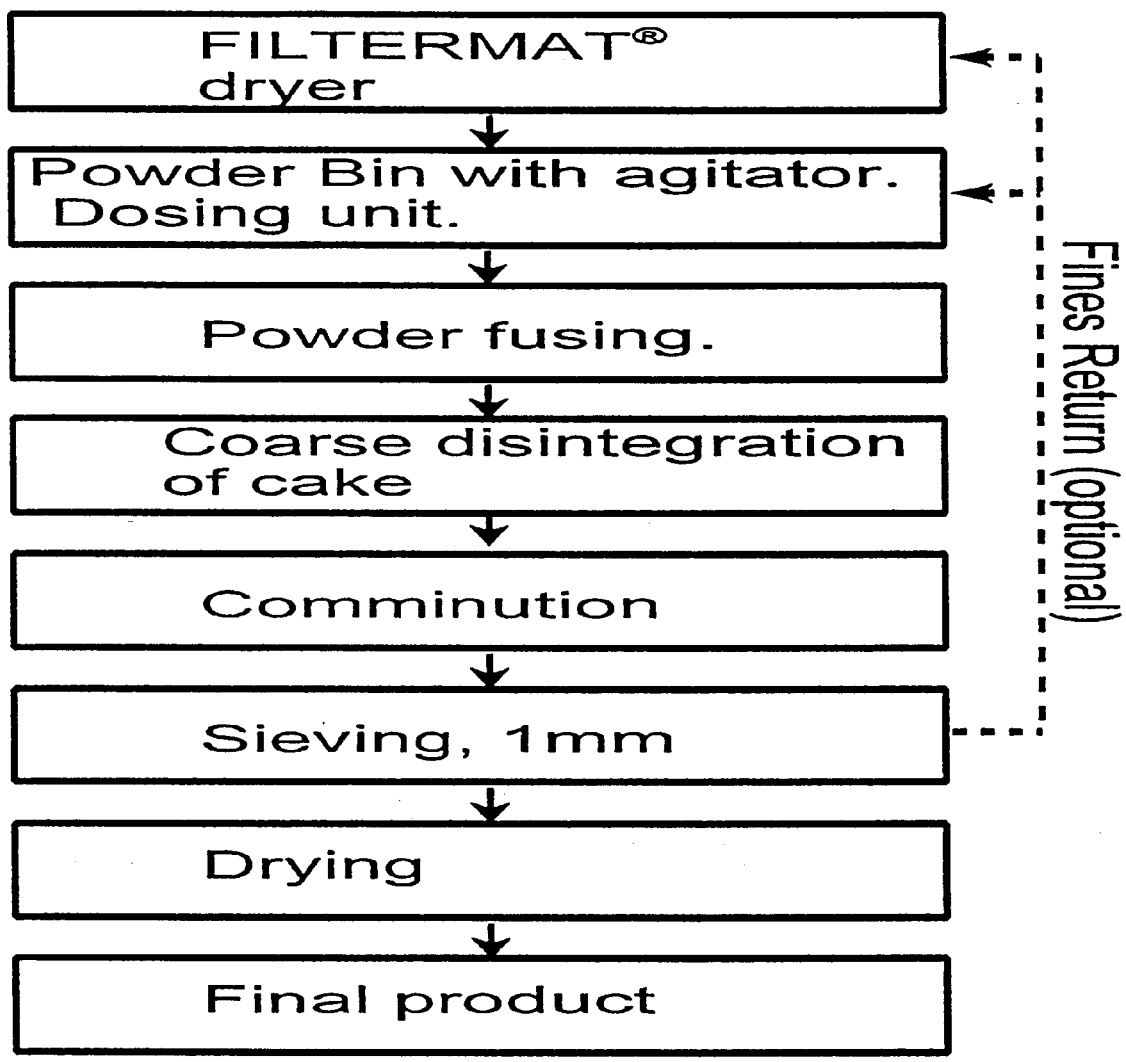
FIG. 3 is a flow sheet illustrating the process steps described in the Example.

A coffee product was prepared according to the flow sheet illustrated in FIG. 3.

As starting material, a coffee powder having a moisture content of 7.8% by weight obtained by drying an extract of a normal high quality blend with a solids content of 43.3% by weight in a combined spray and belt dryer of the FILTERMAT® type, was used. The colour and bulk density was controlled by injection of gas into the feed.

The powder was temporarily stored in a powder bin provided with agitator and deposited as an even layer on the lower belt of a double belt contact cooker of the type CC 618 available from the company Formcook AB, Helsingborg, Sweden, using a vibrating chute. The layer had an initial thickness of 27.5 mm and was compressed to a thickness of 21 mm during the heat treatment, which was carried out at a temperature of the heating element in contact with the lower belt of 75° C. and a temperature of the heating element in contact with the upper belt of 80° C., so as to obtain a fused cake. The residence time was 10 min. The resulting cake was disintegrated into pieces of 5·5 to 10·10 cm and fed to a Fitzpatrick D6A Comminuter for further disintegration.

The obtained granular material was sieved on a 1 mm sieve, resulting in a yield of product coarser than 1 mm of 55%, which was dried in a belt dryer at 60° C. to obtain a final product having a residual moisture content of 3.5% by weight and a bulk density of 0.22 g/l.

The fines fraction from the sieving process could be recirculated to the heat treatment step via the powder bin and/or the FILTERMAT® dryer.

In the preceding the process according to the invention has been explained with reference to particular embodiments. However it will be appreciated that various modifications could be made by the person skilled in the art without deviating from the scope or spirit of the invention. E.g. the process according to the invention could be used as a post treatment of a product having been partially dried by freeze drying, whereby a substantial part of the expensive freeze drying process could be eliminated and a more lenient process achieved.

What is claimed is:

1. A process for the preparation of a water soluble coffee or tea product from a non-rewetted particulate material obtained from an extract by drying, wherein
    a layer of particulate material having a substantially uniform moisture content which is higher than the moisture content desired in the product is subjected to a heat treatment being carried out essentially without affecting the moisture content of the particulate material at a combination of temperature and time being adequate for effecting fusion so as to form a compact cake-like structure,
    the cake-like structure is disintegrated into granular material optionally after cooling, and
    the granular material is subjected to final drying, optionally after separation of off-size particles.

2. A process according to claim 1, wherein the particulate material has been obtained from a spray drying process.

3. A process according to claim 1, wherein the particulate material has been obtained from a combined spray drying and belt drying process.

4. A process according to claim 1, wherein the particulate material has been obtained from a freeze drying process.

5. A process according to claim 1, wherein the moisture content of the particulate material is in the range from 4–12% by weight.

6. A process according to claim 5, wherein the moisture content of the particulate material is in the range from 5–11% by weight.

7. A process according to claim 6, wherein the moisture content of the particulate material is in the range from 6–10% by weight.

8. A process according to claim 1, wherein the moisture content of the particulate material is 1–10% by weight (abs.) higher than the moisture content of the final product.

9. A process according to claim 8, wherein the moisture content of the particulate material is 3–8% by weight (abs.) higher than the moisture content of the final product.

10. A process according to claim 1, wherein the heat treatment is carried out in an environment substantially in moisture equilibrium with the particulate material.

11. A process according to claim 1, wherein the layer of particulate material is confined between opposed barriers when the heat treatment is carried out.

12. A process according to claim 11, wherein the barriers are essentially non-pervious to gasses.

13. A process according to claim 11 or 12, wherein one of the opposed barriers or both are defined by or comprise an endless belt.

14. A process according to claim 1, wherein the layer of particulate material is supported on an endless belt or an array of trays during the heat treatment.

15. A process according to claim 14, wherein the endless belt or array of trays is moved continuously.

16. A process according to claim 14, wherein the endless belt or array of trays is moved stepwise.

17. A process according to claim 1, wherein heat is transferred to the layer of particulate material by means of conduction.

18. A process according to claim 17, wherein heat is transferred to the layer of particulate material using heating elements in contact with at least one structure in contact with the layer.

19. A process according to claim 18, wherein the structure in contact with the layer is selected from the group consisting of barriers, belts, trays, and other supporting structures.

20. A process according to claim 18, wherein heat is supplied to the heating elements by means of electricity or a fluid medium.

21. A process according to claim 18, wherein the surface temperature of the heating elements is in the range from 60–120° C.

22. A process according to claim 21, wherein the surface temperature of the heating elements is in the range from 60–90° C.

23. A process according to claim 1, wherein heat is transferred to the layer of particulate material by means of radiation or convection.

24. A process according to claim 1, wherein heat is supplied to provide a temperature in the layer of particulate material in the range from 45–120° C.

25. A process according to claim 24, wherein heat is supplied to provide a temperature in the layer of particulate material in the range from 50–90° C.

26. A process according to claim 1, wherein the heat treatment is carried out for 2–30 min.

27. A process according to claim 1, wherein the thickness of the layer of particulate material during the heat treatment is in the range from 10–50 mm.

28. A process according to claim 1, wherein the heat treatment is carried out under compression of the layer.

29. A process according to claim 28, wherein the layer is compressed to 65–90% of the initial thickness during the heat treatment.

30. A process according to claim 29, wherein the layer is compressed to 70–85% of the initial thickness during the heat treatment.

31. A process according to claim 1, wherein fines are separated from the granular material before final drying and recirculated to the heat treatment step.

32. A process according to claim 1, wherein fines are separated from the granular material before final drying and recirculated to the drying process.

33. A process for the preparation of a water soluble coffee or tea product from a non-rewetted particulate material obtained from an extract by drying, wherein a layer of particulate material having a substantially uniform moisture content of 4–12% by weight which is 1–10% by weight (abs.) higher than the moisture content desired in the product, is heated to a temperature of 45–120° C. in an environment substantially in moisture equilibrium with the particulate material for a period of 2–30 min. so as to form a compact cake-like structure, which is disintegrated into granular material optionally after cooling, and the granular material subjected to final drying, optionally after separation of off-size particles.

34. A process for the preparation of a water soluble coffee or tea product from a non-rewetted particulate material obtained from an extract by drying, wherein a layer of particulate material having a substantially uniform moisture content of 4–12% by weight which is 1–10% by weight (abs.) higher than the moisture content desired in the product, is confined between opposed endless belts being essential-ly non-pervious to gases, and heated to a temperature of 45–120° C. for a period of 2–30 min. so as to form a compact cake-like structure, which is disintegrated into granular material optionally after cooling, and the granular material subjected to final drying, optionally after separation of off-size particles.

35. A process according to claim 1, wherein the particulate material has been obtained from at least one of a spray drying process and a freeze drying process.

* * * * *